United States Patent
Liu et al.

(10) Patent No.: US 9,933,612 B2
(45) Date of Patent: Apr. 3, 2018

(54) UNBALANCED HUB DESIGN

(71) Applicant: Materion Corporation, Mayfield Heights, OH (US)

(72) Inventors: Xin Liu, Shanghai (CN); Irene Xu, Shanghai (CN); Simon Cao, Shanghai (CN)

(73) Assignee: MATERION CORPORATION, Mayfield Heights, OH (US)

(*) Notice: Subject to any disclaimer, the term of this patent is extended or adjusted under 35 U.S.C. 154(b) by 0 days.

(21) Appl. No.: 15/677,488

(22) Filed: Aug. 15, 2017

(65) Prior Publication Data

US 2018/0031821 A1 Feb. 1, 2018

Related U.S. Application Data

(62) Division of application No. 14/789,324, filed on Jul. 1, 2015, now Pat. No. 9,733,469.

(51) Int. Cl.
*G02B 26/00* (2006.01)
*G01M 1/30* (2006.01)
(Continued)

(52) U.S. Cl.
CPC ............. *G02B 26/008* (2013.01); *G01M 1/14* (2013.01); *G01M 1/30* (2013.01); *G02B 26/00* (2013.01);
(Continued)

(58) Field of Classification Search
CPC .... G02B 26/00; G02B 26/008; G02B 26/007; G01M 1/30; G01M 1/14; G03B 21/008; G03B 33/08
(Continued)

(56) References Cited

U.S. PATENT DOCUMENTS

| 9,453,999 B2* | 9/2016 | Osaka | G03B 21/16 |
| 2002/0105729 A1* | 8/2002 | Richards | G02B 26/008 |
| | | | 359/634 |

(Continued)

FOREIGN PATENT DOCUMENTS

| CN | 101300514 A | 11/2008 |
| CN | 101589325 A | 11/2009 |

(Continued)

OTHER PUBLICATIONS

Tawian Office Action for Taiwan Application No. 106117115 dated Oct. 11, 2017.

*Primary Examiner* — William R Alexander
(74) *Attorney, Agent, or Firm* — Richard M. Klein; Fay Sharpe LLP (57) ABSTRACT

A optical device comprises a colour wheel, the colour wheel having a hub portion configured to act as a rotor for coupling to a motor and having a disk-shaped surface; an optically active radial portion, attached to or integrated with the hub portion and configured to optically process incident light; and a balancing adaptation to the disk-shaped surface of the hub portion, comprising one or more of: (a) a recess in the disk-shaped surface extending to an edge of the disk-shaped surface; (b) an annular groove in the disk-shaped surface having a non-uniform width and/or being non-concentric with the disk-shaped surface; (c) an annular groove in the disk-shaped surface, at least a portion of which is filled by a balancing mass part; and (d) a groove and/or a matrix of recesses in the disk-shaped surface arranged to define a portion of an annulus in shape.

20 Claims, 6 Drawing Sheets

(51) Int. Cl.
  *G03B 33/08*    (2006.01)
  *H04N 9/31*    (2006.01)
  *G03B 21/00*    (2006.01)
  *G01M 1/14*    (2006.01)

(52) U.S. Cl.
  CPC ......... *G02B 26/007* (2013.01); *G03B 21/008* (2013.01); *G03B 33/08* (2013.01); *H04N 9/3114* (2013.01)

(58) Field of Classification Search
  USPC .................. 362/323; 359/892, 885, 891
  See application file for complete search history.

(56) References Cited

U.S. PATENT DOCUMENTS

| | | | | |
|---|---|---|---|---|
| 2006/0028746 A1* | 2/2006 | Niwa | ................... | G02B 26/008 359/892 |
| 2006/0237357 A1* | 10/2006 | Jia | ...................... | G02B 26/008 210/330 |
| 2007/0086098 A1* | 4/2007 | Sekiguchi | ............ | G02B 26/008 359/892 |
| 2007/0236816 A1* | 10/2007 | Auell | .................... | F16F 15/32 359/891 |
| 2007/0273841 A1* | 11/2007 | Yu | ......................... | G03B 33/08 353/84 |
| 2008/0062546 A1* | 3/2008 | Davis | ................... | H04N 9/3114 359/892 |
| 2008/0100940 A1* | 5/2008 | Tsai | ...................... | G02B 26/008 359/889 |
| 2008/0297933 A1* | 12/2008 | Hsu | ....................... | G02B 26/008 359/892 |
| 2012/0033189 A1* | 2/2012 | Hsu | ....................... | G02B 26/008 353/84 |
| 2013/0258639 A1* | 10/2013 | Hu | ........................... | F21V 9/08 362/84 |
| 2014/0140038 A1* | 5/2014 | Gerets | ................... | G03B 21/16 362/84 |
| 2015/0229892 A1* | 8/2015 | Dai | ....................... | H04N 9/3158 353/31 |
| 2015/0354787 A1* | 12/2015 | Chang | ..................... | H04N 9/00 362/84 |
| 2016/0291315 A1* | 10/2016 | Hsu | ....................... | G02B 26/008 |

FOREIGN PATENT DOCUMENTS

| | | |
|---|---|---|
| CN | 104595852 A | 5/2015 |
| TW | M274552 | 9/2005 |

\* cited by examiner

UNBALANCED HUB DESIGN

CROSS-REFERENCE TO RELATED APPLICATIONS

This application is a divisional of U.S. patent application Ser. No. 14/789,324, filed Jul. 1, 2015, now U.S. Pat. No. 9,733,469, the contents of all of which are fully incorporated by reference herein.

TECHNICAL FIELD

The following relates to a colour wheel (which may include a phosphor wheel) and a method for manufacturing a colour wheel.

BACKGROUND

Colour wheels are used in a variety of optical devices such as projection-based or other picture generation systems using Digital Light Processing (DLP) technology. The colour wheel comprises a hub portion, which is a disk-shaped body to act as a rotor, when coupled to an associated motor. A optically-active radial portion is attached to or integrated with the outer part of the hub portion. In a colour wheel, the optically-active portion typically includes one or more colour filters, for filtering incident light. These are typically planar glass segments coated with a thin film in order to reflect or transmit light characteristically in a wavelength dependent manner. Multiple colour filters may be provided in different sections of the radial optically-active portion, so that rotation of the colour wheel causes incident light to be affected differently by these different portions For example, this can result in white light being split up into a range of colours and provide colour-sequential illumination when the colour wheel is rotated. Another type of colour wheel uses wavelength conversion materials (phosphors) to generate emission light of a different wavelength from incident excitation light. These can be termed colour phosphor wheels.

In use, colour wheels are rotated at a high speed, typically between 7200 rpm and 14400 rpm. The colour wheel structure is intended to be rotationally symmetric in terms of mass distribution to minimise imbalance, which can result in vibration issues and reduce the product's lifetime. In particular, colour filters of the type discussed above are each mostly formed of a substrate with the same material density (for example, 2.38 g/cm$^3$ for glass). This assists in achieving balance. In such cases, an initial dynamic imbalance should be less than 150 mg@R8.25 mm, especially for an aluminium hub of 30 mm outer diameter after assembly. There are existing approaches to improving imbalance in such a situation, some of which will be discussed below. These will typically be able to correct such a small imbalance.

More recently, a hybrid, wheel structure has been developed for use in laser projectors to generate colour sequential illumination with laser speckle reduction. In this structure, one colour filter in the optically active radial portion may be replaced by a translucent diffuser segment, comprising soda-lime glass (density 2.5 g/cm$^3$), which is typically of a higher density than the glass colour filters. It can be significantly more difficult to control the thickness of the diffuser segment, because of problems in etching or polishing this part. The initial imbalance of the hybrid wheel assembly is therefore increased, for example to greater than 300 mg@R8.25 mm in a 60 mm diameter colour wheel.

As noted above, a number of techniques for improving the balance of a colour wheel are known. One possible technique is material removal (from the hub portion), for example as described in US-2007/236816. Material removal may be carried out at multiple planes along the axis of rotation of the colour wheel, in some such approaches. These approaches may allow correction of imbalance up to 150 mg@R8.25 mm. Another balancing approach is material addition, for example as explained in US-2003/035218 (where a balancing substance is added into an annular groove provided on the hub portion), US-2009/021851 (in which balancing weights are positioned in an annular groove and these can be moved to improve balance) and US-2011/063745 (describing a two-dimensional matrix of holes in the hub portion, which can be filled with balancing masses, such as an adhesive filled into one or more of the holes). These approaches cannot generally correct as wide a range of imbalances, for example allowing correction up to 100 mg@R8.25 mm imbalance.

These existing approaches do not offer sufficient ability to correct high imbalances, especially when inhomogeneous materials are used in the colour wheel, as discussed above. Balancing the colour wheel should be achieved with high accuracy, high speed, high cost-efficiency and without increasing the size of the colour wheel significantly. Achieving all these objectives represents a significant challenge.

BRIEF SUMMARY

Against this background, there is provided a colour wheel comprising a hub portion configured to act as a rotor for coupling to a motor and having a disk-shaped surface, an optically active radial portion attached to or integrated with the hub portion and configured to optically process incident light, and a balancing adaptation to the disk-shaped surface of the hub portion. The balanced adaptation comprises one or more of: (a) a recess in the disk-shaped surface extending to an edge of the disk-shaped surface; (b) an annular groove in the disk-shaped surface having a non-uniform width and/or being non-concentric with the disk-shaped surface; (c) an annular groove in the disk-shaped surface, at least a portion of which is filled by a balancing mass part; and (d) a groove and/or a matrix of recesses in the disk-shaped surface arranged to define a portion of an annulus in shape. A method for manufacturing a colour wheel comprises: attaching or integrating a hub portion and an optically active radial portion, the hub portion for acting as a rotor to be coupled to a motor and having a disk-shaped surface and the optically active radial portion for optically processing incident light so as to provide an optical effect when the colour wheel is rotated; and providing a balancing adaptation to the disk-shaped surface of the hub portion. The balancing adaptation comprises one or more of: (a) a recess in the disk-shaped surface extending to an edge of the disk-shaped surface; (b) an annular groove in the disk-shaped surface having a non-uniform width and/or being non-concentric with the disk-shaped surface; (c) an annular groove in the disk-shaped surface, at least a portion of which is filled by a balancing mass part; and (d) a groove and/or a matrix of recesses in the disk-shaped surface arranged to define a portion of an annulus in shape. Other preferred features are disclosed with reference to the claims and in the description below.

A colour wheel (which includes phosphor wheels, hybrid wheels or other types of rotatable optical processing devices) has a hub portion forming its centre and an optically active radial portion, which is positioned around the hub portion and either integrated with or attached to it. The hub portion has a disk-shaped surface (preferably the hub portion is disk-shaped and more preferably annular, a disk-shape normally being circular) and is designed to be a rotor, so that it can be coupled to an associated motor and rotated thereby. An adaptation is made to the hub portion to provide balance. This balancing adaptation to the disk-shaped surface of the hub portion, comprises one or more of: (a) a recess in the disk-shaped surface extending to an edge of the disk-shaped surface (in particular, when the hub portion is annular, the edge that is distal from its centre); (b) an annular groove in the disk-shaped surface having a non-uniform width and/or being non-concentric with the disk-shaped surface, for instance defined by two non-concentric circles; (c) an annular groove in the disk-shaped surface, at least a portion of which is filled by a balancing mass part; and (d) a groove and/or a matrix of recesses in the disk-shaped surface arranged to define (only) a portion of an annulus in shape. The balancing adaptation may comprise two, three or all of (a), (b), (c) and (d). The optically active radial portion may comprise one or more of: a light filter; a light (wavelength) converter; and a light diffuser.

These range of specific non-symmetric features (which may be considered asymmetric or mismatched in comparison with the disk-shaped surface) can also provide improved balance of the colour wheel in comparison with existing designs, especially when the mass of the optically active radial portion is non-uniform along its circumference. The balancing adaptation may be arranged to compensate for the non-uniform mass distribution of the optically active radial portion, for example because a part of the optically active radial portion has a (significantly) different density in comparison with the remainder of the optically active radial portion. This may be the case when the part of the optically active radial portion is a diffuser segment. The part may have a higher density than the remainder, for instance if the part comprises soda lime glass or a borosilicate glass. In any case, at least part (and possible all) of the balancing adaptation may be positioned on the hub portion adjacent or opposite to the part of the optically active radial portion with the different density. This may provide balance, for example by offsetting a non-uniform mass distribution of the optically active radial portion.

A particularly effective feature of type (a), a recess in the disk-shaped surface extending to an edge of the disk-shaped surface, comprises a recess across a region of the disk-shaped surface bounded by a chord (in geometrical terms, defined as a segment of the disk-shaped surface). This can be achieved by taking a slice from an edge of the hub portion, for example by milling.

The (c) annular groove in the disk-shaped surface is preferably at least 30%, 35%, 40%, 45%, 50%, 60%, 70%, 80% or 90% filled by the balancing mass part and optionally 100% filled and/or the annular groove is no more than 90%, 80%, 70% or 60% filled by the balancing mass part. The (d) groove and/or matrix of recesses in the disk-shaped surface may be partially (or entirely) filled with a balancing mass part. In either case, the balancing mass part may be configured to fit the groove or recess, such as in the form of a clip with a configurable position. Additionally or alternatively, the balancing mass part may comprise a set adhesive material. Advantageously, the density of the balancing mass part is different (more preferably, greater) than that of the hub portion, although the density of the balancing mass part may be less than or the same as that of the hub portion.

Optionally, the balancing adaptation further comprises one or both of: (e) an annular groove in the disk-shaped surface; and (f) a matrix of recesses in the disk-shaped surface arranged to define a full annulus in shape. Where two annular or partially annular grooves and/or matrix of recesses are provided, they may positioned with different radii from a centre of the disk-shaped surface.

In some embodiments, the colour wheel further comprises one or both of: a light management portion (which may be configured to perform one or more of: reflection, refraction, dispersion and combination of light); and a light modulation portion (for instance, configured to modulate and/or demodulate light).

In another aspect, a method for manufacturing a colour wheel, comprises: attaching or integrating a hub portion and an optically active radial portion, the hub portion for acting as a rotor to be coupled to a motor and having a disk-shaped surface and the optically active radial portion for optically processing incident light so as to provide an optical effect when the colour wheel is rotated; and providing a balancing adaptation to the disk-shaped surface of the hub portion, comprising one or more of: (a); (b); (c); and (d) (as specified above). Any specific feature or features of the colour wheel specified herein may equally be understood as defining corresponding steps for manufacturing the feature or features.

The step of providing a balancing adaptation further optionally comprises: effecting the balancing adaptation in the disk-shaped surface of the hub portion in an initial configuration; determining an imbalance to the colour wheel in the initial configuration; and adjusting the configuration of balancing adaptation to compensate for the imbalance. Determining an imbalance to the colour wheel may comprise (directly or indirectly) measuring the imbalance, preferably during rotation of the colour wheel (although the imbalance may be determined by calculation without measurement during rotation, for example by theoretical analysis). Adjusting the configuration of the balancing adaptation to compensate for the imbalance optionally comprises one or more of: adding a balancing mass part to the disk-shaped surface; configuring a balancing mass part; where the balancing adaptation comprises one or more recesses or grooves, adjusting one or more dimensions of the one or more recesses or grooves; and adding one or more recesses or grooves.

The combination of any two or more specific features disclosed herein is also provided, even if that combination is not explicitly detailed.

BRIEF DESCRIPTION OF THE DRAWINGS

The invention may be put into practice in a number of ways, and preferred embodiments will now be described by way of example only and with reference to the accompanying drawings, in which.

DETAILED DESCRIPTION OF PREFERRED EMBODIMENTS

A number of embodiments will be described with reference to a hub portion of a colour wheel. Although the term colour wheel is used herein, this is intended to include phosphor wheels as well. The hub portion is metal and is configured to act as a rotor for coupling to a motor. The hub portion has a disk-shaped (circular) surface and is typically entirely disk-shaped, normally in the form of circular disk. As explained above, an optically active radial portion is attached to or integrated with the (outer of the) hub portion and configured to optically process incident light (so as to provide an optical effect when the colour wheel is rotated). In particular, different parts of the radial portion may have different colour filters (or different phosphors) so that rotation of the colour wheel results in colour sequential illumination.

The approaches discussed herein are particularly designed to improve balance for a colour wheel where the optically active radial portion has a non-uniform mass along its circumference. For example, a part of the optically active radial portion may have a (significantly) different density in comparison with the remainder of the optically active radial portion. This is especially true where the optically active radial portion has a high density segment, for example using soda-lime glass, to act as a diffuser. Whilst such embodiments are preferred, they should not be understood as exhaustive and the balancing adaptations discussed herein may be applied to other types of colour wheel (and phosphor wheel) arrangements. Balancing adaptations are particularly applied to the hub portion and therefore, a number of hub portion configurations will be discussed below. It should be understood that the colour wheel is formed based on this hub portion. In the preferred embodiment, the hub portion is attached to the optically active radial portion. However, the two parts may be integrated.

A number of different types of balancing adaption are considered:

(a) a recess in the disk-shaped surface of the hub portion that extends to an edge of the disk-shaped surface (distal from its centre);

(b) an annular groove in the disk-shaped surface having a non-uniform width and/or being non-concentric with the disk-shaped surface;

(c) an annular groove in the disk-shaped surface, at least a portion of which is filled by a balancing mass part; and (d) a groove and/or a matrix of recesses in the disk-shaped surface arranged to define (only) a portion of an annulus in shape.

Embodiments making use of these balancing adaption, individually and in combination will now be discussed. These approaches are intended to allow correction of imbalances in the range −500~500 mg @ R8.25 mm of 30 mm outer diameter Aluminium hub and −850~850 mg@R13 mm of 48 mm outer diameter Aluminium hub.

Figure 1A:
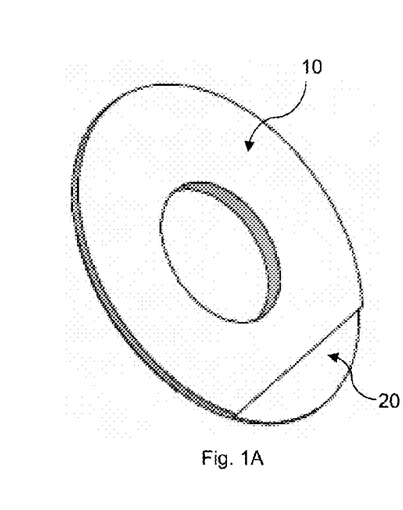
FIGS. 1A, 1B and 1C show example first, second and third embodiments of a colour wheel hub.

Referring first to FIG. 1A, there is shown an example first embodiment of a colour wheel hub 10. A section of the body has been removed from the top surface of the hub edge to reduce the mass of the hub 10 in that portion, leaving a recess 20. This may be called a slice-cut recess. The dimensions (width and/or depth) of the recess 20 can be set to match an initial imbalance of the colour wheel.

More generally, this may be seen as a recess in the disk-shaped surface extending to an edge of the disk-shaped surface. In particular, the edge of the disk-shaped surface may be the edge that is distal from its centre, especially where the disk-shaped surface is annular and therefore has two edges. This recess preferably comprises a recess across a region of the disk-shaped surface bounded by a chord. In mathematical terms, this is considered a segment of the disk-shaped surface. Such pressures are usually low-cost and can relatively/forwardly be assembled. Nevertheless, the range of imbalances that can be corrected using this technique is still limited, since this correction range is restricted by the hub dimension and thickness. This recess is formed by milling.

Figure 1B:
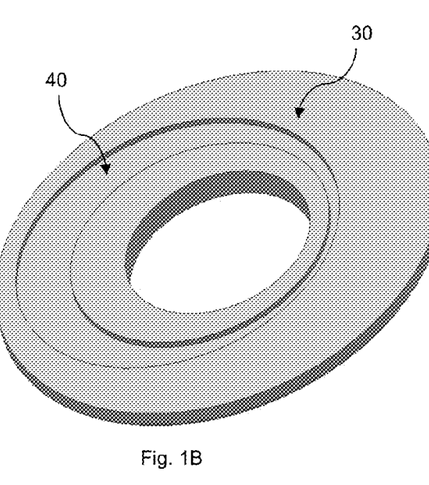

Referring next to FIG. 1B, there is shown an example second embodiment of a colour wheel hub 30. In this embodiment, there is provided an annular groove 40 in the disk-shaped surface, having a non-uniform width. Additionally, the annular groove 40 may be understood non-concentric with the disk-shaped surface. In this particular embodiment, the annular groove 40 is defined by two non-concentric circles of differing radius. In another sense, the annular groove 40 is asymmetric in comparison with the disk-shaped surface of the hub 30.

The annular groove 40 is formed by milling. One or more of: the circles' diameter; eccentricity distance; and groove depth can be set based on an initial imbalance of the colour wheel. This annular groove changes the mass distribution of the hub portion 30 and can therefore help to offset an imbalance in the optically active radial portion.

This design can be advantageous as it is relatively insensitive to alignment during assembly and does not impact on the bonding strength between the hub portion and optically active radial portion. However, there are drawbacks of this approach. The range of imbalances that can be corrected is limited using this technique. Moreover, such a technique may be more expensive than other known approaches.

Figure 1C:
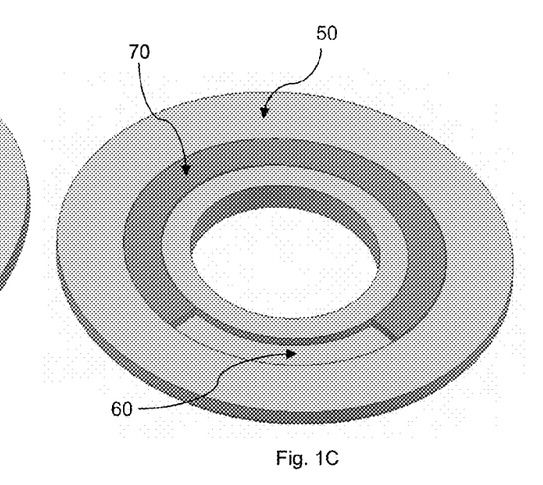

Referring next to FIG. 1C, there is shown a third embodiment of a colour wheel hub 50. Here, a circular, annular groove 60 is provided on the top disk-shaped surface of the hub 50. A C-shaped metal clip 70 is provided in the groove 60 and the position of this clip 70 is set to an appropriate angle to allow alignment for balancing.

In general, such an approach may be understood as providing an annular groove in the disk-shaped surface, at least a portion of which is filled by a balancing mass part. In this specific case, the balancing mass part is a metal clip, although other kinds of balancing mass may be provided. In either case, these preferably fit the cross-section of the annular groove. In particular, only a portion of the annular groove may be filled by the balancing mass part in preferred embodiments. The annular groove need not be circular.

This approach involves a relatively simple design assembly process. Nevertheless, the range of imbalances that can be corrected using this technique is limited. Moreover, the cost to implement this technique is relatively high in comparison with other approaches.

The approaches described above with reference to FIGS. 1A, 1B and 1C offer an improved balancing adaptation. Other approaches based on this technique are possible. For example, a groove and/or a matrix of recesses in the disk-shaped surface may be arranged to define a portion of an annulus in shape (preferably, only a portion of an annulus in shape) or a complete annulus in shape. The skilled person will understand that the groove and/or matrix of recesses may be positioned with respect to a part of the optically radial portion that is denser (or less dense) than the remainder of the optically radial portion, in order to correct an imbalance. Further improvement may be achieved by using the same technique multiple times or combining techniques, as will now be discussed.

Figures 2A, 2B:
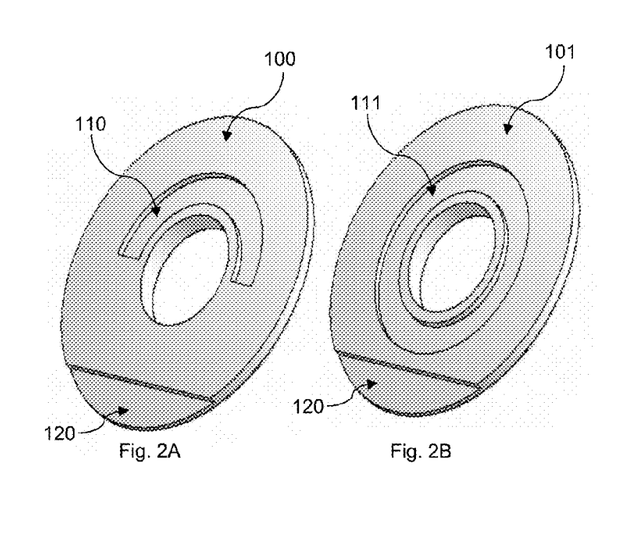
FIGS. 2A and 2B show example fourth and fifth embodiments of a colour wheel hub.

Referring now to FIG. 2A, there is shown an example fourth embodiment of a colour wheel hub 100. A semi-circular groove 110 is provided in the disk-shaped surface of the hub 100. Moreover, a slice cut-recess 120 (similar to type shown in FIG. 1A) is provided. It will be understood that this can be more generally implemented by combining a recess in the disk-shaped surface extending to an edge of it with a groove in the disk-shaped surface arranged to define only a portion of an annulus in shape. The combination of these two features may improve the range of imbalance that can be corrected.

Referring now to FIG. 2B, there is shown an example fifth embodiment of a colour wheel hub 101, which is similar to the fourth embodiment shown in FIG. 2A. The slice cut-recess 120 of FIG. 2A is also implemented in this embodiment. However, rather than a semi-circular groove 110, a circular groove 111 is provided in the hub 101. This groove 111 (and optionally, the semi-circular groove 110 of FIG. 2A) can be supplemented with a c-shaped clip or other balancing mass (such as described above with reference to FIG. 1C). This design may also improve the range of imbalance that can be corrected. Moreover, the addition of a balancing mass (especially to the embodiment shown in FIG. 2B) can further increase the range of imbalance that may be corrected.

Typically, the cost to implement the approaches disclosed in FIGS. 2A and 2B are not as expensive as, for example, those described in FIGS. 1B and 1C. On the other hand, the addition of a balancing mass may increase the risk of failure, for example due to the balancing mass becoming detached and flying off the hub during use. If adhesive is used to fill any recess or groove or to bond balancing mass to the hub, any overflow of this adhesive may impact the balancing accuracy.

Figures 3A, 3B:
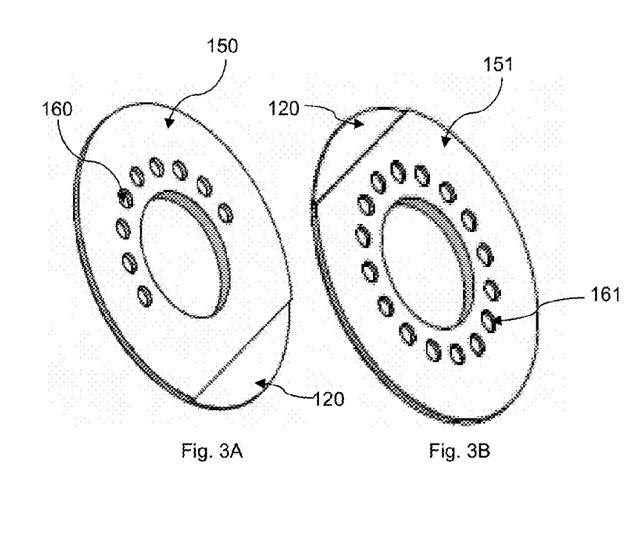
FIGS. 3A and 3B show example sixth and seventh embodiments of a colour wheel hub.

Referring now to FIG. 3A, there is shown an example sixth embodiment of a colour wheel hub 150. In common with previous embodiments, the hub 150 has a slice cut-recess 120. The details of this have been discussed above and will not be repeated. Moreover, a matrix of wells 160 is provided. The wells are arranged in a semi-circle around the centre of the hub 150. Essentially, the design of FIG. 3A is similar to that of FIG. 2A, but with the semi-circular groove 110 being replaced by the semi-circular wells matrix 160. The wells can be filled with a material, preferably of high density, to increase the range of imbalance that can be corrected. This provides a significant advantage, since the filling of the wells matrix 160 (adding mass to the hub portion 150) can be achieved in a fairly straightforward way. Moreover, the addition of balancing mass can be done in a relatively robust and pre-defined manner. This may improve tolerance to error in application of the balancing mass.

Referring next to FIG. 3B, there is shown a seventh embodiment of a colour wheel hub 151, which is similar to the sixth embodiment shown in FIG. 3A. Again, a slice cut-recess 120 is provided and the details of this will not be repeated to avoid unnecessary complexity. Rather than a semi-circular arrangement of wells 160, a circular arrangement of wells 161 is provided. The range of imbalance that may be corrected by this embodiment may be different (possibly wider) compared with the embodiment shown in FIG. 3A, for example.

Figure 4:
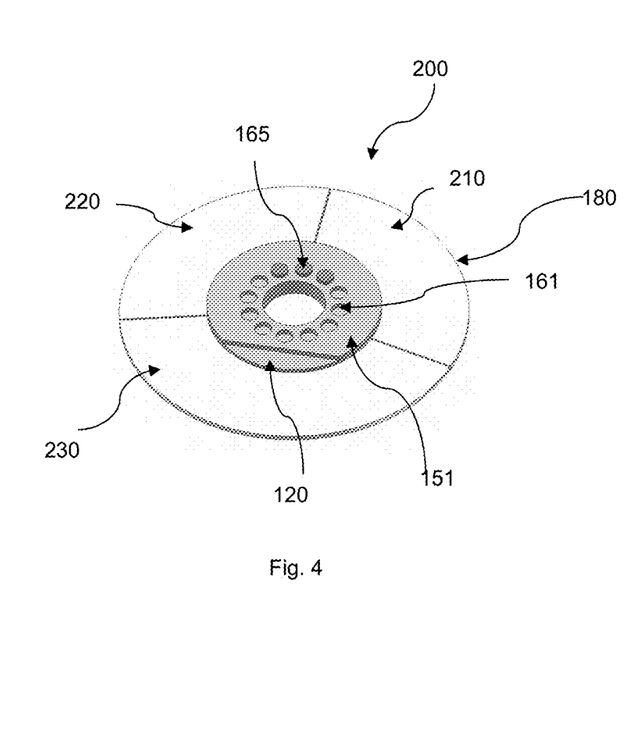
FIG. 4 depicts an example colour wheel using the colour wheel hub of the seventh embodiment.

Referring to FIG. 4, there is depicted an example colour wheel 200 using the colour wheel hub 151 of FIG. 3B. Where the features of any previous embodiments are shown, identical reference numerals are employed. Some of the wells in the circular arrangement of wells 161 have been filled with balancing masses 165. Also shown is the optically active radial portion 180. This is divided into segments: a first glass colour filter segment 210; a second glass colour filter segment 220; and a high density segment 230. The high density segment 230 is the diffuser glass, discussed above. In this embodiment, the diffuser glass is soda lime glass. This is advantageous as the surface cluster micro-structure can be readily formed by wet etching. The balancing masses 165 may be provided initially or they may be added after the colour wheel 200 is initially made to improve imbalance compensation.

A range of example techniques for adapting the colour wheel hub to improve balancing have been described. Methods for balancing the colour wheel will now be discussed. In a hybrid wheel structure, the density of one segment is different from the others. Taking only this effect into account, an initial imbalance $M_0$ can be determined. The segment size tolerance will contribute an imbalance $M_1$. The hybrid wheel assembly process will also cause an imbalance $M_2$. Considering these three effects, the total initial imbalance value of an assembled hybrid wheel $M_i$ is equal to $M_0+M_1+M_2$.

The purpose of any balancing technique is to reduce $M_i$ to zero or at least to no greater than a threshold value (a specification limitation). Then, an initial imbalance value for the hub $M_d$ can be determined and this should be set equal to $M_i$ or close to $M_i$, based on some adjustment range. As noted above, changing the characteristics of the hub structure, specifically by the formation and/or adjustment of a balancing adaptation is a way to realize a value for $M_d$ that meets the desired parameter.

In general terms (which may be applied independently from the specific balancing adaptations disclosed herein), a balancing adaptation to a hub portion of a colour wheel may be configured by: effecting the balancing adaptation in the disk-shaped surface of the hub portion in an initial configuration; determining an imbalance to the colour wheel in the initial configuration; and adjusting the configuration of the balancing adaptation to compensate for the imbalance. This therefore provides an iterative-based approach to correcting the imbalance. The imbalance to the colour wheel may be determined by measurement during a test, during which the colour wheel is rotated. The configuration of the balancing adaptation to compensate for the imbalance may comprise one or more of: adding a balancing mass part to the disk-shaped surface; configuring a balancing mass part (by changing its size, orientation and/or position); where the balancing adaptation comprises one or more recesses or grooves, adjusting one or more dimensions of the one or more recesses or grooves; and adding one or more recesses or grooves. In another general sense (which again may be applied independently from the specific balancing adaptations disclosed herein), this may be consider a combination of correcting an imbalance in the colour wheel by adding material and removing material from the hub portion.

Figure 5A:
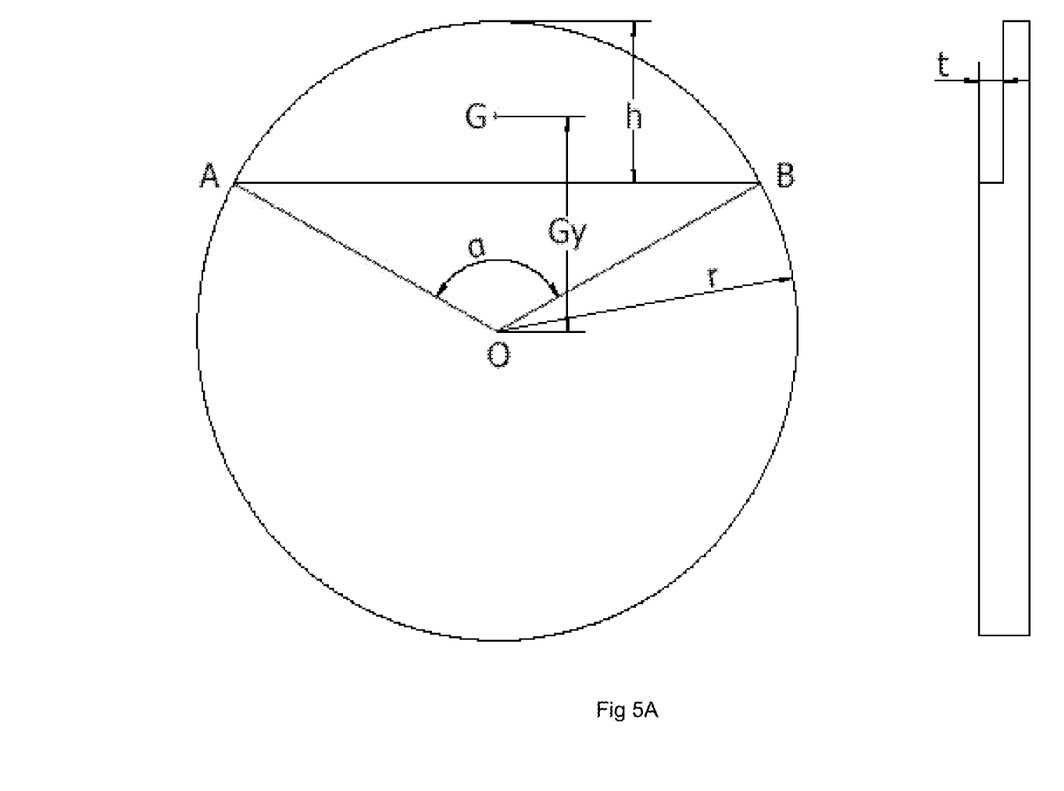
FIG. 5A schematically illustrates geometrical aspects of a weight balancing technique based on the embodiment of FIG. 1A.

Referring to FIG. 5A, there are schematically illustrated geometrical aspects of a weight balancing technique based on the embodiment of FIG. 1A, in which a slice cut in the disc shaped surface is provided. On the left-hand side, there is shown a front view of the hub and on the right-hand side, there is shown a side view. Certain dimensions of the hub structure are identified.

In order to determine the hub initial imbalance value, $M_d$, the area of the slice cut portion S is first calculated. It can be seen that S is given be the following expression.

$$S = \alpha * \pi * r^2 / 360 - (r^2 * \sin \alpha)/2.$$

This provides a slice cut portion imbalance value $M_{cut}$ as given below, where represents the density of hub material and t is the slice cut thickness, as illustrated in FIG. 5A.

$$M_{cut} = S * t * \rho$$

Then, the hub initial imbalance value $M_d$ can be determined as follows, where $G_y$ represents the distance between the slice cut portion centre of gravity and hub centre and $R_b$ represents the required dynamic balance measuring radius.

$$M_d = M_{cut} * G_y / R_b; G_y$$

Figure 5B:
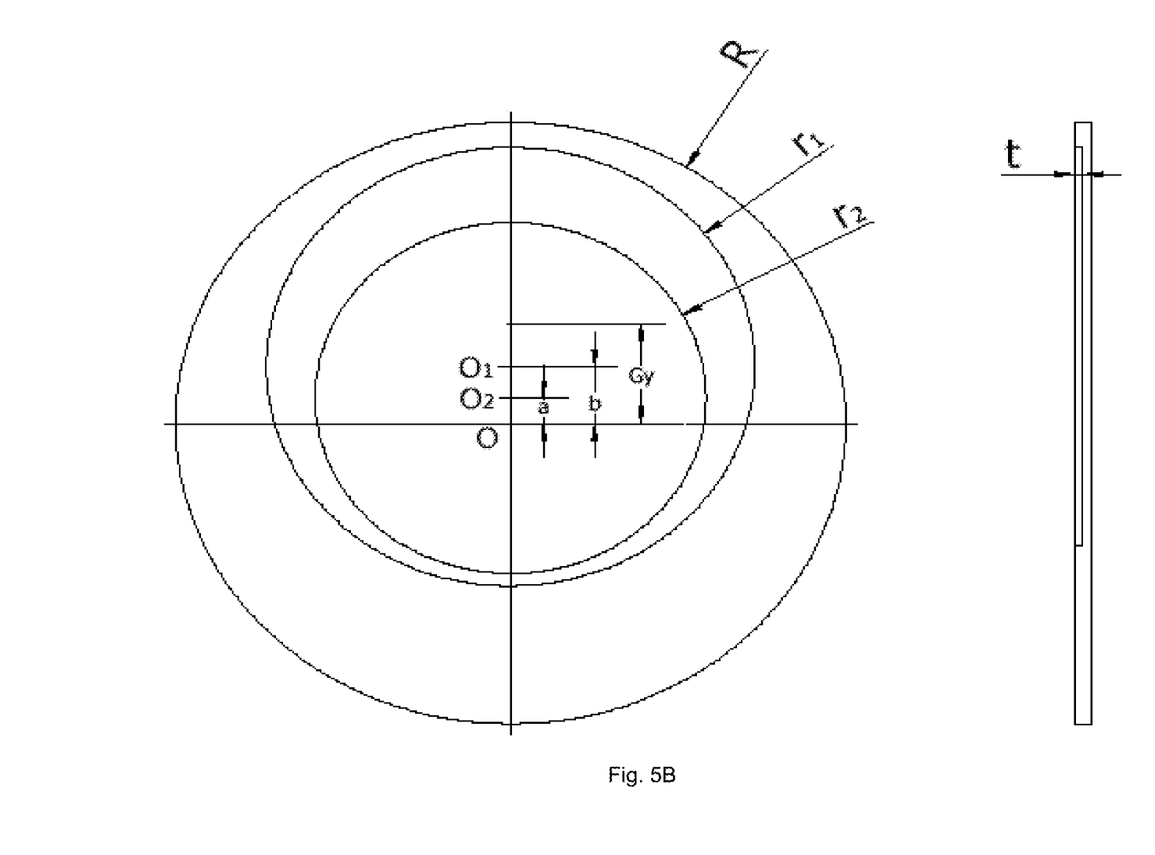
FIG. 5B schematically illustrates geometrical aspects of a weight balancing technique based on the embodiment of FIG. 1B.

Referring next to FIG. 5B, there are schematically illustrated geometrical aspects of a weight balancing technique based on the embodiment of FIG. 1B, in which a non-uniform width annular groove in the disc shaped surface is provided. On the left-hand side, there is shown a front view of the hub and on the right-hand side, there is shown a side view. Certain dimensions of the hub structure are identified.

The area of the annular groove is provided by the following expression.

$$S_{cut} = \pi(r_1^2 - r_2^2).$$

The annular groove imbalance volume is then calculated as follows, wherein ρ represents the density of hub material and t is the thickness of the groove (as shown in FIG. 5B).

$$m_{cut} = S_{cut} * t * \rho.$$

The hub initial imbalance value is then expressed as follows, wherein Gy represents the distance between the gravity center of the annular groove portion and hub center and $R_b$ indicates the required dynamic balance measuring radius.

$$M_d = M_{cut} * Gy / R_b.$$

Figure 5C:
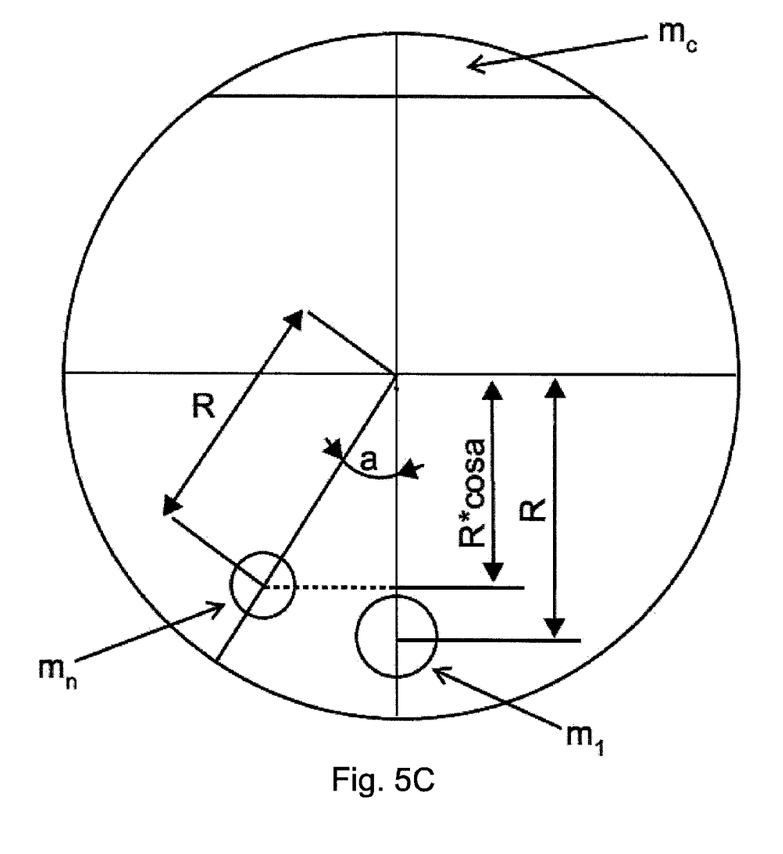
FIG. 5C schematically illustrates geometrical aspects of a weight balancing technique based on the embodiments of FIGS. 2A to 3B.

Referring now to FIG. 5C there are schematically illustrated geometrical aspects of a weight balancing technique based on the embodiment of FIGS. 2A to 3B (particularly FIGS. 3A and 3B), in which a slice cut is combined with a matrix of recesses in the disc shaped surface. Certain dimensions of the hub structure are identified.

As FIG. 5C shows, the slice cut may provide an imbalance value $M_c$, as detailed above with reference to FIG. 5A above ($M_c$ being equal to $M_d$ calculated there). The wells' additional mass $M_1, M_2 \ldots M_n$ provide a further imbalance value of $M_n = R * M * \cos \alpha / R_s$, where R is a radius of the well; M represents the mass of the added mass; a represents the angle between well of mass $M_n$ and well of mass $M_1$; and $R_s$ represents a radius of imbalance measurement defined by a specification or specifications. Then, the total initial imbalance value, $M_d = M_c + M_1 + M_2 + M_3 + \ldots M_n$. Further masses may then be added or removed in order to achieve a desired imbalance value.

For instance, it will be recognized that, where a part of the optically active radial portion has a higher density in comparison with the remainder of the optically active radial portion, a recess or groove or a widest part of a recess of groove (that is, a material removal feature) should be positioned on the hub portion adjacent to that part, whereas a balancing mass part (that is, a material addition feature) should be positioned on the hub portion opposite to that part. Conversely, where a part of the optically active radial portion has a lower density in comparison with the remainder of the optically active radial portion, a recess or groove or a widest part of a recess of groove (that is, a material removal feature) should be positioned on the hub portion opposite to that part, whereas a balancing mass part (that is, a material addition feature) should be positioned on the hub portion adjacent to that part.

Although specific embodiments have been described, the skilled person will understand that variations and modifications are possible. For example, the hub portion can be made from other materials than metal, as can, the colour filters and high density part and any balancing mass part, such as C-shaped metal clip 70. Other types of material may be used as a balancing mass. The hub portion need not be strictly circular, although any deviation from circular will make balancing more difficult. Whilst the embodiment shown in FIG. 1B, has an annular groove 40 having a non-uniform width and non-concentric with the disk-shaped surface, it will be understood that other embodiments may have only one of these two features.

Milling of recesses and/or grooves is the most preferred manufacturing technique, but other ways of forming these features are possible. Alternative shapes of grooves or recesses may be provided, which need not be circular or in the shape of part of a circle or arc. The slice-cut recess need not be bounded by a chord and may have a different and optionally a shape that is not defined by a straight line (or another straight line-based geometric shape).

In FIG. 4, it will be understood that the colour wheel hub 151 may be replaced with any other hub as provided for herein. Although a part with relatively high density is provided on the optically active radial portion 180 of the colour wheel, it will be understood that embodiments with a relatively low density may be used instead.

Alternative materials to soda lime glass for a diffuser material may include other types of glass such as a crown-type glass or a borosilicate glass (such as a BK7-type glass). Other processing methods may include grinding or sandblasting in addition or as alternatives to wet etching.

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. An optical device comprising a colour wheel, wherein the colour wheel comprises:
   a hub portion, configured to act as a rotor for coupling to a motor and having a disk-shaped surface;
   an optically active radial portion, attached to or integrated with the hub portion and configured to optically process incident light; and
   a balancing adaptation to the disk-shaped surface of the hub portion, comprising one or more of:
   (a) a recess in the disk-shaped surface extending to an edge of the disk-shaped surface;
   (b) an annular groove in the disk-shaped surface having a non-uniform width and/or being non-concentric with the disk-shaped surface;
   (c) an annular groove in the disk-shaped surface, at least a portion of which is filled by a balancing mass part; and
   (d) a groove and/or a matrix of recesses in the disk-shaped surface arranged to define a portion of an annulus in shape;

wherein the optically active radial portion has a non-uniform mass along its circumference due to a part of the optically active radial portion having a different density in comparison with the remainder of the optically active radial portion, and wherein at least part of the balancing adaptation is positioned on the hub portion adjacent or opposite to the part of the optically active radial portion with the different density.

2. The optical device of claim 1, wherein the balancing adaptation further comprises one or both of:
 (e) an annular groove in the disk-shaped surface; and
 (f) a matrix of recesses in the disk-shaped surface arranged to define a full annulus in shape.

3. The optical device of claim 1, wherein the (a) recess in the disk-shaped surface extending to the edge of the disk-shaped surface comprises a recess across a region of the disk-shaped surface bounded by a chord.

4. The optical device of claim 1, wherein the (b) annular groove in the disk-shaped surface having a non-uniform width is at least partly defined by two non-concentric circles.

5. The optical device of claim 1, wherein the (c) annular groove in the disk-shaped surface is at least 50% filled by the balancing mass part.

6. The optical device of claim 1, wherein the (c) annular groove in the disk-shaped surface is no more than 90% filled by the balancing mass part.

7. The optical device of claim 1, wherein the (d) groove and/or the matrix of recesses in the disk-shaped surface is partially filled with a balancing mass part.

8. The optical device of claim 1, wherein the density of the balancing mass part is different than that of the hub portion.

9. The optical device of claim 1, wherein the balancing mass part comprises a set adhesive material or a clip configured to fit a groove in the disk-shaped surface.

10. The optical device of claim 1, wherein the balancing adaptation comprises two or more of (a), (b), (c) and (d).

11. The optical device of claim 1, wherein one or more of:
 the part of the optically active radial portion has a higher density in comparison with the remainder of the optically active radial portion and the balancing adaptation comprises a recess or groove positioned on the hub portion adjacent to the part of the optically active radial portion with the higher density;
 the part of the optically active radial portion has a higher density in comparison with the remainder of the optically active radial portion and the balancing adaptation comprises a balancing mass part positioned on the hub portion opposite to the part of the optically active radial portion with the higher density;
 the part of the optically active radial portion has a lower density in comparison with the remainder of the optically active radial portion and the balancing adaptation comprises a recess or groove positioned on the hub portion opposite to the part of the optically active radial portion with the lower density; and
 the part of the optically active radial portion has a lower density in comparison with the remainder of the optically active radial portion and the balancing adaptation comprises a balancing mass part positioned on the hub portion adjacent to the part of the optically active radial portion with the lower density.

12. The optical device of claim 1, wherein one or more of:
 the balancing adaptation comprises a balancing mass part positioned on the hub portion adjacent or opposite to the part of the optically active radial portion with the different density;
 the balancing adaptation comprises (a) and the recess is positioned on the hub portion adjacent or opposite to the part of the optically active radial portion with the different density;
 the balancing adaptation comprises (b) and a widest part of the annular groove is positioned on the hub portion adjacent or opposite to the part of the optically active radial portion with the different density; and
 the balancing adaptation comprises (d) and the groove and/or matrix of recesses are positioned on the hub portion adjacent or opposite to the part of the optically active radial portion with the different density.

13. The optical device of claim 1, wherein the optically active radial portion comprises a diffuser segment.

14. The optical device of claim 13, wherein the diffuser segment comprises soda lime glass and/or borosilicate glass.

15. The optical device of claim 1, wherein the colour wheel further comprises one or both of:
 a light management portion; and
 a light modulation portion.

16. The optical device of claim 1, wherein the optical device is a projection-based system or a picture generation system.

17. The optical device of claim 1, further comprising a motor coupled to the colour wheel.

18. The optical device of claim 1, wherein the colour wheel further comprises phosphors or a light filter.

19. An optical device comprising a colour wheel, wherein the colour wheel comprises:
 a hub portion, configured to act as a rotor for coupling to a motor and having a disk-shaped surface;
 an optically active radial portion, attached to or integrated with the hub portion and configured to optically process incident light; and
 a balancing adaptation to the disk-shaped surface of the hub portion, comprising (b) an annular groove in the disk-shaped surface having a non-uniform width and/or being non-concentric with the disk-shaped surface.

20. The optical device of claim 19, further comprising a motor coupled to the colour wheel and wherein the colour wheel comprises phosphors and the optical device is a projection-based system or a picture generation system.

* * * * *